United States Patent [19]

Krstic et al.

[11] Patent Number: 5,470,806
[45] Date of Patent: Nov. 28, 1995

[54] MAKING OF SINTERED SILICON CARBIDE BODIES

[76] Inventors: Vladimir D. Krstic; Milan Vlajic, both of Queen'University, Department of Materials and Metallurgical Eng., Nicol Hall, Kingston, Ontario, Canada, K7L 3N6

[21] Appl. No.: 123,918

[22] Filed: Sep. 20, 1993

[51] Int. Cl.$^6$ ..................................................... C04B 35/56
[52] U.S. Cl. .................. 501/90; 501/89; 501/91; 501/93; 264/65
[58] Field of Search .................. 501/88, 89, 90, 501/91, 93; 264/64, 65

[56] References Cited

U.S. PATENT DOCUMENTS

| | | | |
|---|---|---|---|
| 4,354,991 | 10/1982 | Suzuki et al. | 264/65 |
| 4,502,983 | 3/1985 | Omuri et al. | 252/516 |
| 4,569,921 | 2/1986 | Omuri et al. | 501/88 |

*Primary Examiner*—Karl Group
*Assistant Examiner*—Chris Gallo

[57] ABSTRACT

Pressureless sintering is used to densify silicon carbide based ceramics using a compound comprising transition metal oxides and aluminum oxide at temperatures in excess of 1850° C. The resulting sintered body has a density greater than 95% of its theoretical density, flexural strength in excess of 560 MPa and fracture toughness of 7.2 MPa.m$^{1/2}$. The method consists of sintering and conversion of transition metal oxides into carbides in one step operation. Practically any transition metal oxide can be used. The sintered ceramic bodies made by the present invention consist of silicon carbide matrix phase and Al$_2$O$_3$ and transition metal carbide phases.

9 Claims, No Drawings

MAKING OF SINTERED SILICON CARBIDE BODIES

BACKGROUND OF THE INVENTION

The invention relates to a composition and method of manufacturing a sintered silicon carbide and mixtures of silicon carbide and transition metal carbide bodies. More particularly, the invention relates to the addition of various transition metal oxides to first promote densification and then convert them into carbides.

THE PRIOR ART

Silicon carbide based ceramics are currently being considered for a number of advanced structural applications requiring high strength, fracture toughness and hardness, resistance to corrosion and erosion, and high wear resistance. Due to this unique combination of properties, silicon carbide is being used for the manufacture of cutting tools, grinding wheels and many other wear resistance components, or can be added to other metal or ceramic matrices such as aluminum, silicon nitride or titanium carbide.

The major problems associated with the use of silicon carbide both in monolithic and in combination with other ceramics, are that its sintering to high density requires very high temperature and, as sintered, it has unacceptable low fracture toughness, normally less than 4 $MPa.m^{1/2}$.

Sintering of silicon carbide in the absence of pressure (pressureless sintering) has been accomplished using sintering aids. Sintering aids include boron (B), carbon (C) or boron carbide ($B_4C$) and aluminum (Al) or alumina ($Al_2O_3$). These sintering aids have been used to obtain nearly single phase silicon carbide (SIC) with densities greater than 97% of theoretical. (Theoretical density, as is well known in the art, is the density of a fully dense ceramic body). The densification and mass transport in the presence of B, C and Al takes place through the solid state diffusion and requires temperatures of at least 2100° C.

Pressureless sintering of SiC can also be accomplished with the addition of rare earth oxides such as oxides of yttrium (Y), lanthanum (La), cerium (Ce), praseodium (Pm), samarium (Sm), europium (Eu), thulium (Tm), ytterbium (Yb), lutetium (Lu) and indium (In). In the past, very little or no densification was found to occur if other oxides are used as sintering aids. Since pressureless sintering provides the fabrication of complex and relatively inexpensive shapes, it would be an improvement in the art if SiC ceramics can be sintered to high density using transition metal oxides which are less expensive and can give a variety of microstructures. Addition of carbides, borides and oxides of group IVa and VIa elements to silicon carbide ceramics is employed in U.S. Pat. No. 5,108,965.

In addition to single elements, combination of group IVa and VIa and other elements were also used in order to assist sintering of silicon carbide (U.S. Pat. Nos. 4,354,991, 4,859, 638 and 4,874,725).

In the above prior arts, the sintering conditions were such that initial mix, remained in its original form without conversion to borides or carbides. The presence of carbides and borides in silicon carbide is highly desirable because of large improvements in fracture toughness, wear resistance and other properties. The toughening of silicon carbide ceramics may be accomplished by adding carbide or boride in the initial mix but this step makes the process expensive and commercially uncompetitive.

Sintering of SiC to high density using rare earth oxides is described in detail in U.S. Pat. Nos. 4,502,983 by Omori et al. 4,564,490 by Omori et. al. and 4,569,921 by Omori et al. Canadian patent No.125626 by Virkar et. which disclose a method for densifying a mixture of SiC and SiCALON using a liquid phase provided by the carbothermal reduction of alumina. The above techniques do not result in SiC having high fracture toughness.

Another method of sintering SiC (U.S. Pat. No. 4,829, 027) uses liquid phase formed between $Al_2O_3$ and a mixture of rare earth oxides at sintering temperatures. According to this claim, the method is capable of giving high sintered densities using somewhat coarser SiC powders in the micron range rather than submicron range. One of the major problems associated with this prior art is low fracture toughness of the resulting products normally not exceeding 4.7 $MPa.m^{1/2}$.

The strive to increase fracture toughness of silicon carbide has led to the addition of carbides (Am. Ceram. Sic. Bull., 60 [11], 1229, 1981) or borides (Am. Ceram. Soc. Bull. 60 [11], 325, 1987) to silicon carbide by mixing carbide powder in the desired proportion and hot pressing mixtures to achieve densification.

It would be an improvement in the art if SiC ceramics can be toughened fusing oxides which are significantly less expensive than carbides and converting them into carbides in the course of sintering involving one step operation.

SUMMARY OF THE INVENTION

A process for pressureless sintering SiC ceramic body, having densities in excess of 98% of its theoretical density, have been invented. The SiC ceramic body is densified with the help of liquid phase formed by the interaction of about 1 to 29% by weight of $Al_2O_3$, 1 to 29% by weight of mixed transition metal oxides, and 0.1 to 5% by weight of carbon included in the ceramic body. The transition metal oxides are converted into carbides during the sintering process. The resultant ceramic body is greater than 70% by weight SiC and transition metal carbides, has an average grain size of less than 5 micrometers and exhibits a toughness in excess of 7 $MPa.m^{1/2}$.

A method for densifying SiC comprising (1) mixing SiC with about 1 to 29% by weight transition metal oxides, 1 to 29% by weight of $Al_2O_3$ and 0.1–5% by weight of carbon to form a uniform mixture; (2) forming the powder mixture to the desired shapes using conventional ceramic forming techniques (e.g. uniaxial or isostatic pressing, injection moulding, slip casting, tape casting or extrusion); (3) heating the resulting green body surrounded with filling powder, having the composition 30% by weight to 60% by weight SiC, 68% by weight to 38% by weight $Al_2O_3$ and 0.5% by weight to 7% by weight carbon, in a sealed graphite crucible at temperatures from about 1750° C. to about 2050° C. for times varying from about 15 minutes to about 5 hours so as to densify the material to densities greater than 95% of its theoretical density. An alternative method of sintering is the hot isostatic pressing (HIPing) or pressure sintering of the uncontained body at temperatures between 1700° C. and 2000° C. in an inert atmosphere (e.g. argon) under pressure greater than 7 atmospheres.

DETAILED DESCRIPTION OF THE INVENTION

Various transition metal oxides in combination with aluminum oxide form liquids upon equilibrium heating at temperatures in the range of about 1500° C. to about 2000° C. Transition metal oxides are defined, for the purpose of this invention, as oxides of the elements which have unfulfilled d-orbitals. These elements are: Sc, Ac, Ti, V, Cr, Mn, Fe, Co, Ni, Os, Zr, Nb, Mo,Ru, Hf, Ta, W, Re, B and La.

In the sintering of SiC powder, the difficulty in obtaining a high density product is attributed to the exaggerated grain growth that takes place during the final stage of sintering and coarse grains having a grain size of 100 microns or more will thereby be formed in a substantial amount. The same exaggerated grain growth was observed in sintered bodies manufactured from coarse SiC powders. This exaggerated grain growth is known to retard densification and to degrade mechanical properties. It is the object of the present invention to overcome the above mentioned difficulties inherent to the conventional processes and to provide a process for sintering SiC powders, whereby a high density sintered product is readily obtainable by simultaneous conversion of transition metal oxides to carbides and sintering which process leads to an increase in fracture toughness of over 80% over that of conventionally sintered bodies.

It has been discovered in the present invention that the conversion of transition metal oxides to carbides can be achieved by placing the samples in a sealed graphite crucible and surrounding the samples with powder having the composition of 30% to 60% by weight SiC, 38% to 60% by weight $Al_2O_3$ and 0.5% to 7% by weight carbon. It was found that the level of carbon determines critically the extent of conversion of transition metal oxides to carbides. For example, too high amount of carbon, normally above 7% by weight, allows formation of free carbon in the sintered silicon carbide bodies, whereas too little carbon (normally below 0.5% by weight) prevents full conversion of oxides to carbides. Depending on the amount of oxides added, the full conversion of transition metal oxides to carbides is achieved when the carbon powder is added in the amount ranging between 0.5% and 7% by weight, preferably between 1% and 3% by weight. Full conversion of oxides to carbides is essential if high fracture toughness is to be achieved.

The amount and choice of additives are based on the desired properties of the sintered composite. If high toughness and high temperature properties are desired for components used in automotive applications, for cutting tools heat exchangers or turbine blades the amount of transition metal oxides should be high and aluminum oxides should be low. If low toughness and low temperature applications are desired such as some wear parts and machinery operating at less than 1000° C., then more oxides can be added and compositions can be adjusted to allow sintering at lower temperatures. Also, the choice of composition within alumina-transition metal oxide systems is determined by the desired ease of fabrication and various physical and chemical properties such as oxidation resistance, thermal conductivity, or thermal expansion behaviour, desired in the densified ceramic body. The advantage of the present invention is that the liquid phase formed does not necessarily need to wet SiC but the SiC to have reactivity with transition metal oxides and lower affinity for carbon than silicon. The role of transition metal oxides is to lower the melting point of the liquid formed with alumina, and once converted to corresponding carbide, to impart desired properties to the resulting product.

In order to achieve high toughness and hardness and therefore improved wear resistance, the carbide content (silicon carbide and transition metal carbides formed during sintering) should exceed 80%, and preferably 95% by weight. The higher the carbide content the higher the hardness and toughness. Through the disclosed process, SiC having toughness greater than 7.0 $MPa.m^{1/2}$ and four point bend strength greater than 560 MPa were achieved.

Alumina and transition metal oxides can be admixed with the silicon carbide powder by a number of conventional techniques such as, for example, attrition milling, ball milling or any other milling technique in a liquid dispersant or dry. Chemical precursors of the oxides may be used to produce the oxides or oxide compounds.

The wet powder may be dried by conventional techniques (e.g. spray drying, freeze drying, air drying, or palletizing) to allow pressing (uniaxial or isostatic), injection moulding, extrusion, or other forming methods to take place. Any lubricants, binders or similar materials used in shaping the powder mixture should have no significant deteriorating effect on the green body or the resulting sintered body.

The oxides used to promote sintering and to enhance fracture toughness of SiC do not need to have a submicron size, however, it is desired that they be as fine as possible and that they be as well distributed throughout the green ceramic body as possible.

Silicon carbide powder should have a particle size of less than two micrometers and preferably less than one micrometer. Both alpha and beta phase SiC may be used. Boron and aluminum additions are not required, although they may still be used. If boron, or boron compounds are added to the mixtures a microstructure containing boride in various forms can be formed. For example, if boron is added to the mixture containing zirconium oxide, zirconium boride is formed. Similarly if boron is added to the mixture containing titanium oxide, titanium boride is formed.

Typically SiC powders have oxygen contents of less than 1% by weight and preferably less than 0.5% by weight.

Sintering can be accomplished in conventional resistance furnace or induction heated furnace. The sintered atmosphere may be either vacuum, inert, slight reducing, or gas pressure.

Sintering time can vary from a few minutes to 5 hours, preferably in the range between 15 minutes and 45 minutes.

As will be recognized by those skilled in the art, heating regime may be adjusted based on furnace load and the transition metal oxides and carbides used. Ceramic bodies which have been pressureless sintered or pressure sintered to the level when all pores are closed can optimally be hot-pressed or hot isostatically pressed (HIPed) to improve their density.

There is a number of transition metal oxides which may be used to sinter and toughen SiC ceramics. One of the unique features of the present invention is the simultaneous sintering and conversion of oxides into carbides. Once SiC is heated to high temperatures normally above 1400° C., it reacts with oxide to form carbide as illustrated by the following reactions:

$$3\ SiC+TiO_2 \geqq 3\ SiO+TiC+2CO \qquad (1)$$

$$2\ SiC+TiO_2 \geqq SiO+Si+TiC+CO \qquad (2)$$

$$3\ SiC+ZrO_2 \geqq 3\ Si+ZrC+2CO \qquad (3)$$

$$2\ SiC+ZrO_2 \geqq SiO+Si+ZrC+CO \qquad (4)$$

Reactions (1) to (4) show that substantial amount of free silicon should be formed in the course of sintering. Also, due to its high vapour pressure, SiO quickly evaporates from the system and leads to substantial weight loss.

Carbon reacts with transition metal oxides to form carbides:

$$TiO_2 + 3C \geqq TiC + 2CO \quad (5)$$

$$ZrO_2 + 3C \geqq ZrC + 2CO \quad (6)$$

On the other hand, aluminum oxides additive reacts with SiC to form either metallic aluminum (Al) or highly volatile $Al_2O$ according to the following reactions:

$$3\,SiC + Al_2O_3 \geqq 2\,Al + Si + CO \quad (7)$$

$$2\,SiC + Al_2O_3 \geqq Al_2O + 2\,Si + 2\,CO \quad (8)$$

$$SiC + Al_2O_3 \geqq Al_2O + SiO + CO \quad (9)$$

Due to high sintering temperatures, partial pressure of aluminum formed as a result of reaction (7) is high and so most of aluminum formed evaporates leading to enhanced weight loss. Although, from the view point of densification, the reaction between SiC and $Al_2O_3$ is undesirable because of the evolution of large amounts of gases which work against densification, this reaction promotes diffusion and helps achieve densification of the resultant ceramics. The intensity of the reactions and thus the amount of gases liberated from the system depends on the relative ratio of SiC to $Al_2O_3$, the use of filling powder, the rate of heating to sintering temperature, and the sintering time. Higher heating rates, shorter sintering times, higher SiC to $Al_2O_3$ ratios and the presence of filling powder suppress the formation of volatiles during sintering.

glycol and 1 kilogram (kg) of α-SiC grinding media. The slurry was dried in a dryer at 75° C. The powder was dry screened −40 mesh before uniaxially pressing at 50 MPa, followed by cold isostatic pressing at 200 MPa. The rectangular shape specimens (35×16×8 mm) were placed into graphite crucible sealed with graphite foil. Inside crucible, the compacts were surrounded by powder bed composed of 50 wt % SiC, 48 wt % $Al_2O_3$, and 2 wt % carbon black. Sintering was performed at temperatures between 1920° C. and 2050° C. for 40 minutes. The rate of heating was approximately 10° C./minute. Properties of sintered samples are given in Table 1. The strength of bars tested in four point bending (using an inner span of 12 mm. and outer span of 24 mm, a cross head speed of 0.05 mm/minute) at room temperature was 423 MPa.

TABLE 1

| Examp. | Sintering Temperat. (°C.) | Shrinkage (%) | Density (g/cc) | Density (% TD) | Weight Change % | Hardness (GPa) | Frac. Tough MPa · m$^{1/2}$ |
|---|---|---|---|---|---|---|---|
| 1 | 1920 | 17.8 | 3.04 | 90.4 | −2.6 | 14.8 | 3.8 |
| 2 | 1960 | 19.0 | 3.21 | 95.8 | −6.3 | 18.7 | 4.2 |
| 3 | 1980 | 18.7 | 3.24 | 96.3 | −3.1 | 19.9 | 4.5 |
| 4 | 2000 | 17.6 | 3.31 | 97.9 | +1.1 | 20.5 | 4.7 |
| 5 | 2020 | 16.5 | 3.32 | 97.6 | +6.8 | 18.1 | 5.2 |
| 6 | 2050 | 7.5 | 3.37 | 96.0 | 32.0 | 15.4 | 4.6 |

Optical microscopy and x-ray analyses have shown the presence of four different phases They were SiC matrix phase bright phases of ZrC and Si, and grey phase particles of $Al_2O_3$. The mean grain size of SiC matrix was between 3 and 10 micrometers and particles between 0.5 and 4 micrometers.

EXAMPLES 7-9

Silicon carbide (167.8 g), $Al_2O_3$ (6–22 g), $TiO_2$ (8–24 g), and carbon black (2.2 g) were processed and sintered as in Example 4.

The properties of sintered ceramics are given in Table 2.

TABLE 2

| Examp. | Compositions of Powder Mix. (wt %) SiC | Al2O3 | TiO2 | C | Shrinkage (%) | Density (g/cc) | Density % TD | Hardness GPa | Fracture Tough. | Strength MPa MPa · m½ |
|---|---|---|---|---|---|---|---|---|---|---|
| 7 | 83.9 | 11 | 4 | 1.1 | 20.3 | 3.31 | 98.8 | 21.0 | 5.4 | 561 |
| 8 | 83.9 | 7 | 8 | 1.1 | 20.0 | 3.31 | 98.0 | 20.6 | 6.0 | 485 |
| 9 | 83.9 | 3 | 12 | 1.1 | 21.3 | 3.32 | 96.9 | 90.8 | 5.6 | 380 |

The process and products of this invention are explained in detail in the following examples which are illustrative only. Those skilled in the art will recognize that there are numerous modifications and variations and that the present invention is not limited to such examples.

EXAMPLES 1-6

Silicon carbide (176 grams (g)), having a mean particle size of about 0.5 micrometers, $Al_2O_3$ (11.6 g. Alcoa A 16-SG), $ZrO_2$ (8.4 g. Magnesium Electron, E 101) and carbon black (4 g.) were milled for 6 hours in a plastic jar with 300 milliliters (ml) of ethanol, 10 ml. polyethylene The sintered material (Examples 7 and 8) exhibited improvement in all important properties: density, fracture toughness, strength and hardness over that in Example 4.

EXAMPLES 10-12

Silicon carbide (120–166g), $Al_2O_3$ (13.0–17.4 g) $ZrO_2$ (12–12.6 g), $TiO_2$ (5–45 g), and carbon black (4–10 g), were sintered as in Example 5. Inside sealed crucible, compacts were surrounded by a powder bed composed of 50 wt % SiC, 47 wt % $Al_2O_3$ and 3 wt % C. Relevant physical properties are shown in Table 3.

TABLE 3

| Examp. | Compositions of Powder Mix. (wt %) | | | | | Density | | Weight Change | Hardness GPa | Fracture Tough. MPa·m½ | Strength MPa |
| --- | --- | --- | --- | --- | --- | --- | --- | --- | --- | --- | --- |
| | SiC | Al2O3 | TiO2 | ZrO2 | C | (g/cc) | % TD | | | | |
| 10 | 83 | 6.5 | 2.5 | 6.0 | 2.0 | 3.32 | 97.6 | 0.5 | 19.3 | 6.3 | 487 |
| 11 | 60 | 8.7 | 20.0 | 6.3 | 5.0 | 3.71 | 97.5 | −13.9 | 19.7 | 7.2 | 442 |
| 12 | 60 | 6.5 | 22.5 | 6.0 | 5.0 | 3.72 | 98.2 | −16.6 | 18.5 | 6.8 | 441 |

Sintering of SiC with transition metal oxides yielded ceramic bodies with significant improvements in fracture toughness (around 7.0 MPa.m$^{1/2}$) leaving the other properties essentially unchanged.

Numerous variations and modifications of the invention will be recognized by those skilled in the art. For example, compounds containing Zr, Ti, Al and O, could be substituted for $ZrO_2$, $TiO_2$ and $Al_2O_3$ and still provide the condition for densification and conversion to carbides. Both alpha and beta silicon carbide of any polytype can be used in the present invention.

The present invention is unique in the following respects:

a) Transition metal oxides and alumina are used to promote densification at temperatures above 1750° C. Due to the presence of transient liquid phase, the sintering proceeds rapidly.

b) At sintering temperature, the transition metal oxides, such as $TiO_2$ and $ZrO_2$, react with silicon carbide and carbon to form carbides. This in-situ conversion of oxides to carbides provides microstructure capable of yielding fracture toughness higher than 7.0 MPa.m$^{1/2}$ and hardness higher than 20 GPa. Fracture toughness values above 4–5 MPa.m$^{1/2}$ were previously attainable only with the addition of reinforcing agents and only using hot pressing. More importantly, present invention allows large scale production of silicon carbide based ceramics having improved wear resistance and service reliability at lower cost. The present invention eliminates the use of expensive reinforcing additives such as TiC, ZrC, $ZrB_2$ or $TiB_2$ and does not require expensive hot pressing technique.

c) Sintering and conversion to carbides takes place simultaneously in one step operation. This provides considerable flexibility to produce wide variety of microstructures capable of giving higher resistance to crack propagation and high wear resistance. In contrast to conventional techniques of sintering in the presence of liquid phase, where liquid phase remains in the system after sintering, in the present invention the liquid phase is only of transient nature. In the early stage of sintering it serves to promote densification and in the later stages the liquid reacts with carbon and silicon carbide to form carbide and volatile $Al_2O$ and CO which leave the system.

What is claimed is:

1. A process for pressureless sintering of silicon carbide comprising: Forming a mixture consisting essentially of silicon carbide particles having a size from 0.3 to 5 micrometers and from about 1% to about 29% by weight of a transition metal oxide, from about 1% to about 29% by weight of alumina and from 0.1 to 5% by weight carbon; shaping the mixture into a green body; placing the green body into a sealed graphite crucible and surrounding the body with a powder bed consisting essentially of about 30 to 60% by weight of silicon carbide, from 68 to 38% by weight of aluminum oxide, and about 0.5 to 7% by weight of carbon powder, and sintering the green body at a temperature ranging from about 1750° C. to about 2050° C. for about 1 minute to about 45 minutes at atmospheric pressure or above atmospheric pressure of argon or CO gas to produce a resultant sintered body having a fracture toughness higher than 7 MPa.m$^{1/2}$ and hardness higher than 20 GPa.

2. The process of claim 1 wherein said silicon carbide particles are alpha phase silicon carbide particles.

3. The process of claim 1 wherein said silicon carbide particles are beta phase silicon carbide particles.

4. The process of claim 1 wherein said silicon carbide particles comprise a mixture of alpha phase and beta phase particles.

5. The process of claim 1 wherein said sintering is preformed under a reducing or inert gas having a pressure which ranges from 1 atm to 100 atm absolute pressure.

6. The process of claim 1 wherein said green body is prepared by slip casting.

7. A method of manufacturing a dense silicon carbide body containing at least 1% by weight of transition metal carbides produced by in-situ conversion of their oxides into carbides during sintering, wherein said method comprises: (a) mixing of 1 to 29% by weight of alumina, 1 to 7% by weight of carbon, and 1 to 29% by weight of an oxide(s) of at least one element selected from the group consisting of Ti, Zr, Sc, Ac, V, Cr, Mn, Fe, Co, Ni, Os, Nb, Mo, Ru, Hf, Ta, W, Re, B, and La and the balance substantially consisting of silicon carbide; (b) forming the mixture into a green body; (c) placing the green body into sealed crucible; (d) surrounding the body with a powder bed consisting of 1 to 29% by weight of alumina, 0.5 to 7% by weight of carbon, and the balance substantially consisting of silicon carbide; (e) heating in a non-oxidizing atmosphere at 1750° C. to 2100° C. to cause the in-situ conversion of transition metal oxides into carbides simultaneously with sintering of said body.

8. The method of claim 7 wherein said sintering and in-situ conversion of oxides into carbides proceeds in a sealed crucible at a pressure from about 0.1 to about 0.3 MPa.

9. The method of claim 7 wherein the sintered body contains from about 1% by weight to about 40% by weight of transition metal carbides.

* * * * *